Feb. 6, 1962
F. A. BAILEY
3,019,757
VERTICALLY ADJUSTABLE SHIP DECKS
Filed May 7, 1959
3 Sheets-Sheet 1
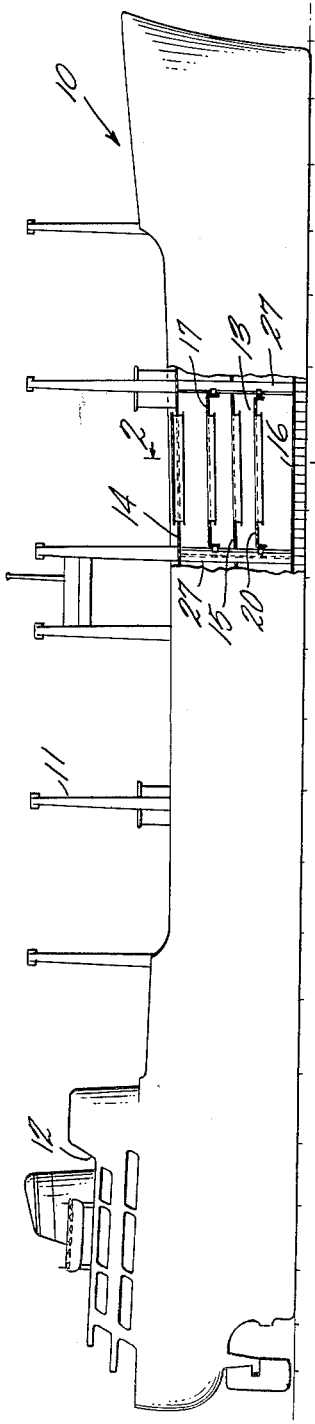
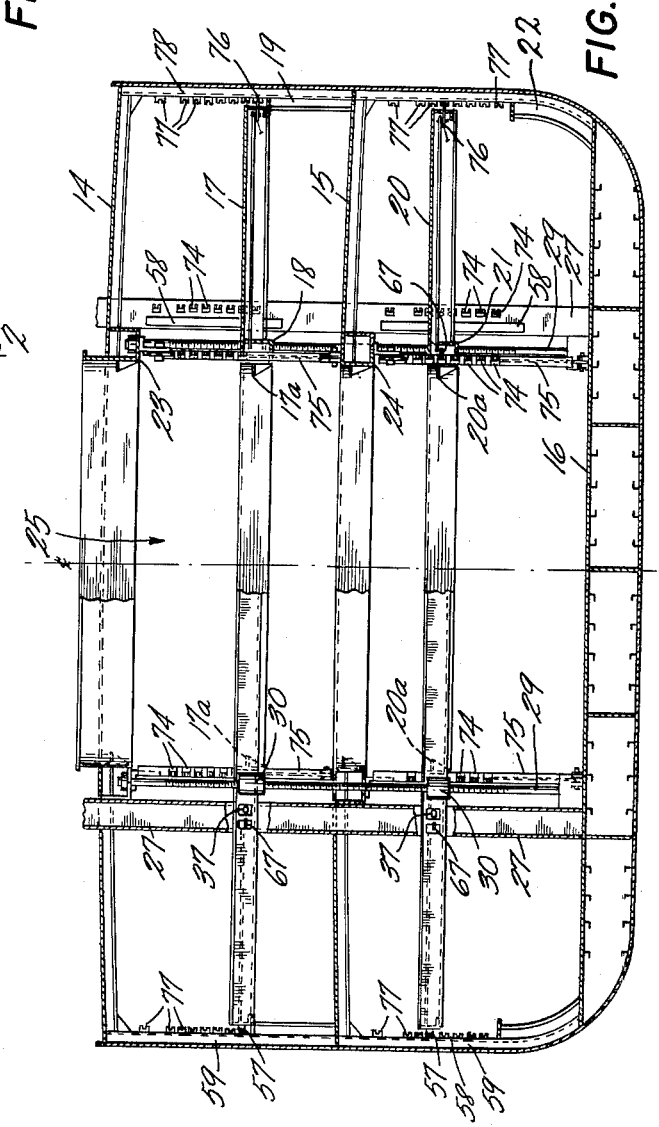
INVENTOR.
FRAZER A. BAILEY
BY
Brumbaugh, Free, Graves + Donohue
his ATTORNEYS.

Feb. 6, 1962 F. A. BAILEY 3,019,757
VERTICALLY ADJUSTABLE SHIP DECKS
Filed May 7, 1959 3 Sheets-Sheet 2

INVENTOR.
FRAZER A. BAILEY
BY
Brumbaugh, Free, Graves + Donohue
his ATTORNEYS

Feb. 6, 1962 F. A. BAILEY 3,019,757
VERTICALLY ADJUSTABLE SHIP DECKS
Filed May 7, 1959 3 Sheets-Sheet 3

INVENTOR.
FRAZER A. BAILEY
BY
Brumbaugh, Free, Graves & Donohue
his ATTORNEYS

3,019,757
VERTICALLY ADJUSTABLE SHIP DECKS
Frazer A. Bailey, San Francisco, Calif.; Wells Fargo Bank American Trust Company and Herman Phleger, executors of said Frazer A. Bailey, deceased
Filed May 7, 1959, Ser. No. 811,614
3 Claims. (Cl. 114—72)

This invention relates to adjustable intermediate decks in cargo ships which enable the efficient stowage and transport of both large and small cargo pieces.

Ordinarily cargo ships are constructed with a number of fixed decks spaced apart to provide sufficient headroom for stowing and transporting cargo pieces of a particular maximum size. If ships are required to transport large trailer trucks, tanks, domestic automobiles and other bulky items on a particular ocean crossing, their fixed decks must be spaced apart sufficiently to accommodate such bulky items. It often happens, however, that smaller cargo units such as foreign automobiles, bales of cotton or small containers must be transported by such ships on the return crossing. Stowing those smaller cargo items in holds with headroom sufficiently great to accommodate tanks and trailer trucks is highly inefficient. Even when smaller packaged items can be piled three or more deep without injury to the bottom packages to utilize some of the waste spaced in the hold, stacking them to the height provided between the widely spaced fixed decks, designed chiefly to carry bulky items, has not proven feasible. Of course, many smaller units such as foreign automobiles cannot be stacked at all.

Attempts in the past to provide ships capable of stowing efficiently both large and small cargo pieces have resulted in various portable racks, fixtures, and inconvenient and impractical small platforms unable to withstand the load stresses ordinarily encountered in cargo ships. Moreover, proposals for platforms have not overcome the problems involved in vertically adjusting such platforms when subjected to forces resulting from listing of the ship and deformation of the ship structure.

To stow and transport large and small cargo items together or on different crossings, a ship must incorporate a vertically adjustable intermediate or tween deck strong enough when fixed in position to support the same loads which a fixed deck ordinarily is called upon to support. Furthermore, such tween deck must include provisions for holding it in fixed relation to the ship structural members to prevent jamming while being moved to a selected vertical position even while the ship is listing to starboard or port.

The problems involved in providing a dual purpose cargo ship with vertically adjustable tween decks are unique. Thus, in the construction of ordinary elevators and like devices, there is no need to be concerned with deformation of the elevator supporting structure or with any forces acting on the elevator guides in directions perpendicular to the elevator's vertical motion.

The present invention overcomes the above-discussed deficiencies of racks, fixtures and small movable platforms in dual purpose cargo ships by providing in ship holds a plurality of vertically adjustable tween decks each movable from an inoperative position, that affords between two fixed decks ample headroom for bulky cargo, to a selected one of a plurality of intermediate positions at which it is locked to accommodate smaller items efficiently on both the fixed deck therebelow and the tween deck.

In particular, a plurality of spaced synchronized drive units shift the tween deck vertically to a selected one of a plurality of intermediate positions. A number of fixed rollers extending from the tween deck edges in one longitudinal direction and in one transverse direction engage tracks mounted on structural members of the ship. Resiliently biased rollers located oppositely to the fixed rollers extend to further tracks from the deck edges and urge the deck in the other longitudinal and transverse directions against the fixed rollers. The tween deck is thereby maintained in a position spaced from the bulkheads and other ship members to preclude jamming regardless of forces thereon caused by ship list, or regardless of deformation of the ship structure. Moreover, in performing the dual functions of preventing transverse and longitudinal shifting of the movable tween deck and of accommodating displacement of the roller tracks due to ship deformation, the roller arrangement relieves the vertical drive units of undesirable lateral stresses.

After the tween deck has been moved to a selected vertical position by the synchronized drive units, latches on the deck edges are operated to engage sockets mounted on the ship structure to lock and support it in place and relieve the drive units of any substantial load. The tween deck when locked will safely transport cargo loads of the same magnitude as the fixed decks in the ship.

Another feature of the invention involves the use of portable and removable stanchions erected between the fixed decks to provide additional support for the tween deck.

These and further advantages of the present invention will be more readily understood when the following description is read in connection with the accompanying drawings, in which:

FIGURE 1 is an elevation, partially broken away, of a ship incorporating a plurality of vertically adjustable tween decks in accordance with the principles of the present invention;

FIGURE 2 is a transverse cross section, somewhat enlarged, of the ship illustrated in FIGURE 1 taken along the view line 2—2 of FIGURE 3 looking in the direction of the arrows;

Figure 3:
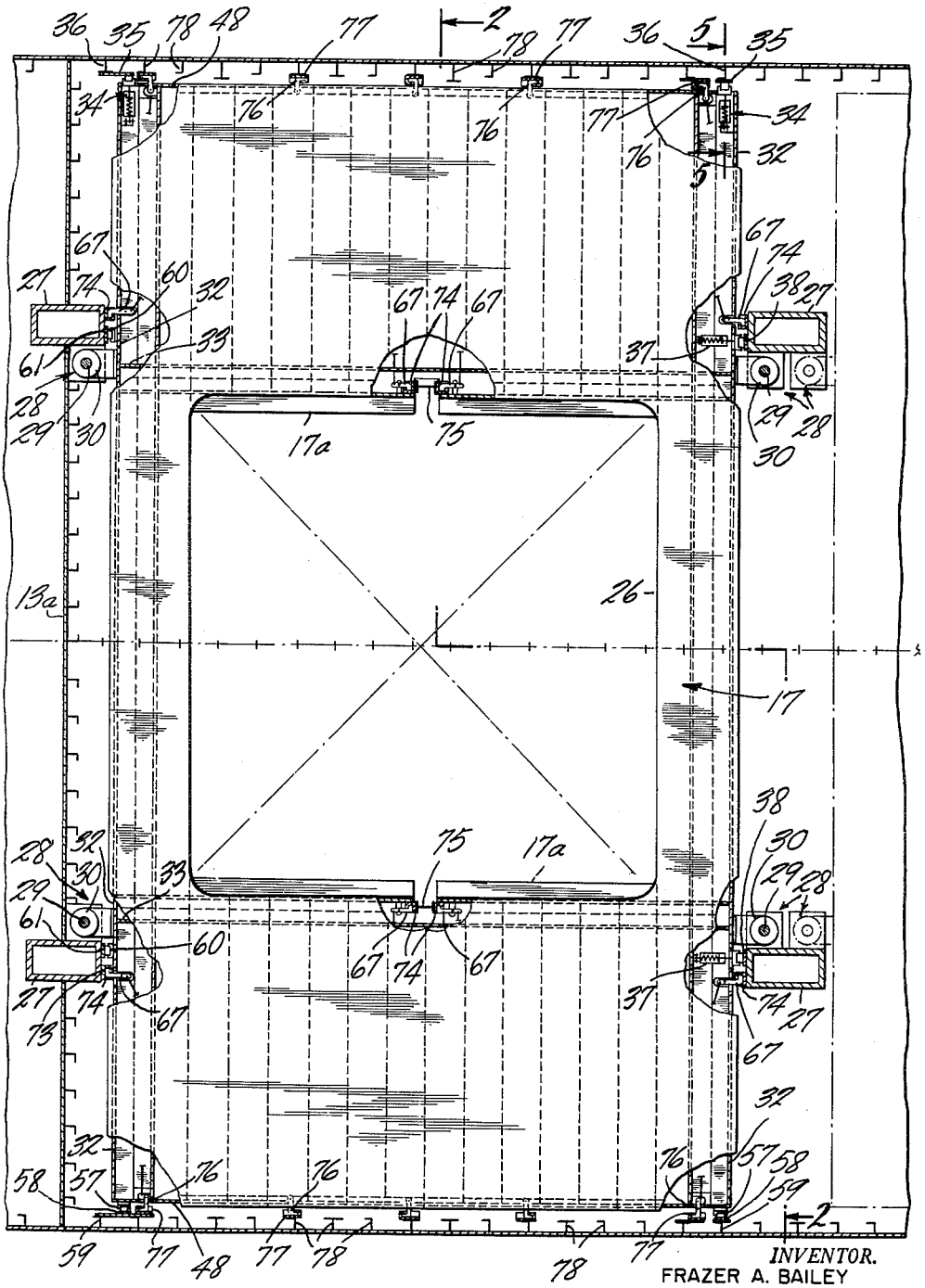
FIGURE 3 is a plan view, greatly enlarged and partially broken away, of one of the vertically adjustable tween decks incorporated in the ship of FIGURE 1.

Referring to an illustrative embodiment of the invention in greater detail with particular reference to FIGURE 1, a cargo ship 10 with conventional loading cranes 11 and superstructure 12, is constructed with a plurality of holds 13 one of which is shown in the drawing by breaking away a section of the ship's hull. A fixed main deck 14 and a fixed second deck 15 are relatively widely spaced from each other and from a floor deck 16 of the hold 13, to provide adequate headroom for bulky pieces.

A vertically adjustable tween deck 17, shown in greater detail in FIGURES 2 and 3, is positioned intermediate the main deck 14 and the second deck 15, and supported when locked in its lowest position on shelves 19. A further tween deck 20 intermediate second deck 15 and hold floor deck 16 is locked in position somewhat above shelves 22 in a manner to be described in detail hereinafter.

Each of the tween decks 17 and 20 may be moved to a plurality of selected positions intermediate its respective lower position and an upper stowed position immediately below the decks 14 and 15 adjacent to fixed supporting girders 23 and 24, respectively. With the tween decks 17 and 20 in their uppermost positions, sufficient headroom is provided between the decks 14 and 15, and 15 and 16, to load through a hatch 25 and stow on the decks 15 and 16 large cargo pieces.

If smaller cargo items such as foreign automobiles or cotton bales must be loaded and stowed for transport on a return crossing, the tween decks 17 and 20 are lowered to suitable intermediate positions and the smaller cargo items stowed on the four decks. Obviously, the cargo carrying capacity of the vessel on the return crossing is increased substantially through the use of the vertically movable tween decks as compared to conventional fixed deck ships which would provide only two decks for such cargo stowage.

Referring to FIGURE 3, the tween deck 17 in the hold 13, formed between watertight bulkheads 13a only one of which is shown, is provided with a hatch opening 26 closed after loading by conventional hatchboards or aluminum pontoons (not shown) supported on depressed shelves 17a on the inboard longitudinal edges of the deck 17. Another similar independently movable tween deck (not shown) is located forwardly of the deck 17 in the hold 13.

Four vertical king posts 27, anchored in conventional fashion at both ends, extend upwardly through the ship. Four synchronized vertical drive units 28 adjacent to the king posts are fastened to the deck 17. Although similar units are also associated with the movable tween deck 20, in the interests of brevity only deck 17 has been referred to and will be referred to in much of the following description.

Figure 4:
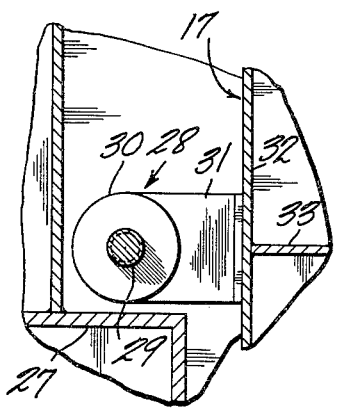
FIGURE 4 is an enlarged fragmentary plan view showing the connection of a drive unit to the tween deck shown in FIGURE 3.

One of the drive units 28 connected to the deck 17, shown in FIGURE 4, comprises a screw rod 29 suitably attached to the ship's structure at its upper and lower ends to place it in tension and eliminate compressive forces. A motor driven rotary ball nut housing 30 moves along the rod 29 when its motor drive is energized. A flange 31 extending from the nut housing 30 is attached to a deck supporting transverse girder 32 which is joined to an inboard deck supporting girder 33. Alternatively, the nut housing 30 may be attached to the adjacent fixed structure of the ship rather than to the structure of the moving deck. This alternate method would involve vertical movement of the rod 29 through the fixed nut housing 30. The nut and rod combination has sufficient flexibility to accommodate small transverse and longitudinal shifts of the tween deck 17. This drive is disclosed fully in U.S. Patent No. 2,836,985 for "Torque Converting Apparatus." It is evident that other drive mechanisms may be substituted for that unit.

The synchronized electric motors of the drive units 28 are controlled by means of suitable conventional operating circuits. Limit switches may be used to position the deck 17 at selected vertical locations. Moreover, the electric drive motor power is arranged, in the event of failure of one motor for any reason, to disconnect and brake all four motors.

The drive units 28 also incorporate fail safe features to lock the tween deck 17 in any position in case of an emergency caused by power loss or improper operation. For example, a ratchet gear with spring loaded pawls may be utilized, one of two pawls being made operative during upward movement while the other pawl functions during downward movement of the deck to prevent reverse rotation of the ball nut.

Cargo ships are subject to many stresses and strains caused by ship trim, motion and cargo weight resulting in distortions of their structures. Such factors are among those which have made impractical the use of movable platforms of conventional construction in cargo ships. The present invention utilizes a roller-track arrangement in combination with latches which holds the deck properly spaced from the ship's structure without jamming at all times in spite of deformation of the ship by any normal forces, and also relieves the vertical drive units of any substantial loads.

Figure 5:
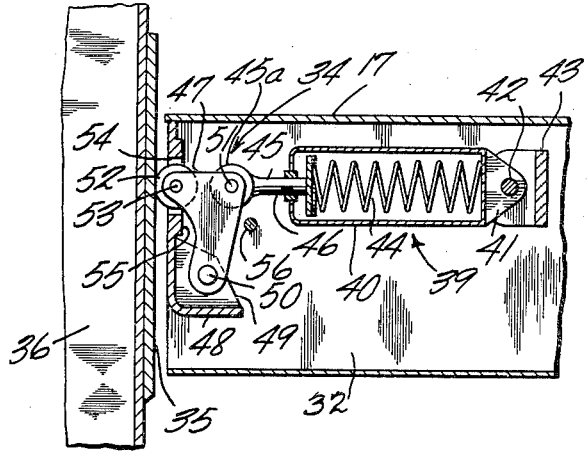
FIGURE 5 is a greatly enlarged partial section showing a resiliently biased roller extending from the tween deck taken along the view line 5—5 of FIGURE 3 looking in the direction of the arrows.
Figure 6:
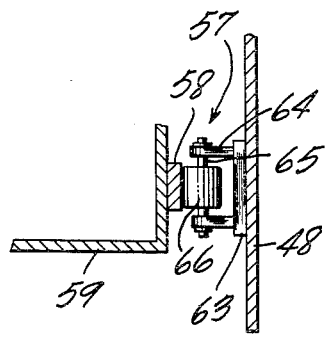
FIGURE 6 is another enlarged fragmentary view showing a fixed roller extending from the tween deck of FIGURE 3.

Examining the roller-track arrangement in detail with reference to FIGURES 3, 5 and 6, two resiliently biased rollers 34 (FIGURE 5), located at the corners of one side of the tween deck 17, extend outwardly into engagement with tracks 35 supported on frame members 36. Two additional resiliently biased rollers 37 extending outwardly from one end of the deck 17 bear against tracks 38 mounted on the king posts 27.

Examining one of the biased rollers 34 with reference to FIGURE 5, a spring cylinder 39 includes a housing 40 pivotally mounted by a flange 41, a pin 42 and a bracket 43, to the transverse girder 32 incorporated in the supporting structure of the movable deck 17. A coil spring 44 urges a rod 45 outwardly through an opening 46 in the cylinder 40. A pair of generally triangular frame members 47, similar to bell cranks, are supported by a flange 49 and pivot pin 50 on the girder 32. The members 47 also are pivoted by a pin 51 on a boss 45a on the end of the rod 45. A roller 52, rotatably supported by a pin 53 between the bell crank members 47, bears against the track 35 through an opening 54 in an outboard girder 48. Movement of the roller 52 outwardly is limited by reinforcing strips 55 framing the openng 54, and movement of the roller inwardly is limited by a pin 56 depending from the supporting structure of the deck 17.

A pair of fixed rollers 57 extend from the side of the tween deck 17 opposite to the biased rollers 34 into engagement with tracks 58 on ship frame members 59. Another pair of fixed rollers 60 extend from the end of the tween deck 17 opposite to the biased rollers 37 into engagement with tracks 61 on the king posts 27.

Examining the fixed roller structure in detail with reference to FIGURE 6, a bracket 63 fastened to the outboard girder 48 incorporates a pair of spaced side plates 64 rotatably mounting a pin 65 which carries a roller 66.

The rollers 34 and 37 are biased sufficiently by the springs 44 to resist longitudinal and transverse movements of the tween decks 17 and 20 under all expected conditions of list and trim. However, the biased rollers 34 and 37 will move inwardly and outwardly to override any minor irregularities in the vertical roller tracks resulting from small deformations of the ship due to stresses and strains. Therefore, the drive units 28 and the screw rods 29 are protected from lateral forces, which would result from transverse or longitudinal shifting of the decks, and clearance between the decks and the ship structure will be maintained under all conditions while the decks are moved vertically, and jamming thereby avoided.

Figure 7:
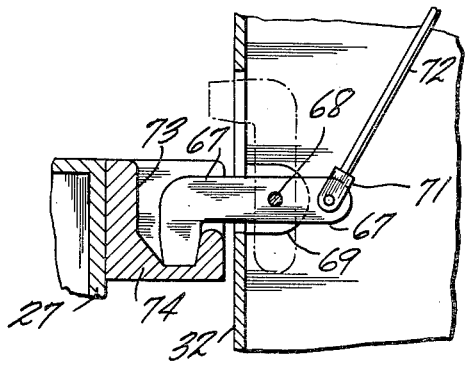
FIGURE 7 is still another enlarged fragmentary view, partially broken away, illustrating latch structure used to lock and support the tween deck of FIGURE 3 in position.

To lock and support the decks 17 and 20 in selected vertical positions, and to relieve the screw rods 29 of substantially all load, a number of latch hooks 67, shown in detail in FIGURE 7, are pivoted by a pin 68 on a bracket 69 securely fastened to the transverse deck supporting girders 32. A coupling link 71 pivotally attached to the end of the hook 67 is joined to a rod 72 operated by a conventional double acting hydraulic cylinder to move the hook between its latched and unlatched positions, the latter being shown in dotted outline. In its latched position, the hook 67 rests in a tapered opening 73 in a socket 74 designed to hold it securely.

A group of the sockets 74 are securely attached to each of the king posts 27, or to other structure described hereinafter, spaced vertically about one foot apart, for example, so that the deck 17 may be locked and supported in position at such intervals. Further sockets 74 near the upper ends of the king posts 27 are used to stow the deck 17 in its inoperative position just below the deck 14.

A pair of removable and portable stanchions 75, bolted to the main supporting girder 24 and pinned to the girder 23 by a slip joint to eliminate loading by the fixed deck 14, are located intermediate the inboard girders 33. The stanchions 75 also carry suitably spaced sockets 74 to cooperate with the latch hooks 67 on the inboard girders 33 and provide added support for the movable deck 17. Similar portable stanchions are provided to assist in bearing the load of the tween deck 20.

A number of smaller latches 76 spaced along the sides of the deck 17, and similar in structure to the latches 67, engage sockets 77, also similar to the sockets 74, attached to frame member 78. To hold the deck 17 securely against transverse and longitudinal movements in both directions, adjacent latches 67 and 76 on the edges of the deck 17 are oppositely oriented, as shown in FIGURE 3. When the latches 67 and 76 are juxtaposed with their respective sockets at one level, they are operated simultaneously by the rods 72 to lock the deck 17 securely in the selected position ready for loading. The construction and spacing of the latches provides the deck 17 with substantially the same load carrying capacity as the fixed deck 15.

In a typical operation of the inventive structure, assuming that the movable tween decks 17 and 20 are initially locked in their uppermost positions immediately below the fixed decks 14 and 15, and further assuming the desirability of moving the deck 17 to an intermediate position for stowage and transport of smaller cargo pieces, the portable stanchions 75 are first bolted into position. The unloaded movable deck 17 is then lowered by means of the drive units 28 to a desired position opposite a set of the latch sockets 74 and 77.

During such lowering operation, the spring biased rollers 34 and 37 urge the deck against the fixed rollers 57 and 60 to prevent transverse and longitudinal shifting thereof due to ship trim or motion, thereby preventing the application of lateral forces to the drive units 28 and the screw rods 29, and jamming of the decks. However, the rollers accommodate small irregularities in the roller tracks caused by deformation of the ship by various stresses and strains.

When the deck 17 reaches its desired location and is stopped by observation, or by actuated limit switches, the rods 72 are operated to move the latch hooks 67 and 76 into their respective sockets 74 and 77 to lock and support the deck 17 in position ready for loading. The deck 20 may be similarly positioned, or it may be left in its uppermost position to provide sufficient headroom on the deck 16 for larger cargo pieces. Cargo may then be loaded and stored for transport in the usual manner.

The present invention makes possible practical dual purpose cargo ships meeting all standard maritime requirements for load carrying ability. Such ships may be used to transport exceptionally large cargo items and yet be efficient in the stowage and transport of smaller cargo pieces. Of course, the inventive structure may be used to provide vertically adjustable tween decks in all of the holds of a ship, or only in one or more of the holds, depending on the cargo to be carried.

It will be understood that the above-described embodiments of the invention are illustrative only and modifications thereof will occur to those skilled in the art. Therefore, the invention is not to be limited to the specific apparatus disclosed herein, but is to be defined by the appended claims.

I claim:

1. In a cargo ship having at least two fixed decks, a vertically movable deck intermediate the two fixed decks, ship structural members depending from the ship and adjacent to the movable deck, a plurality of fixed rollers extending in one longitudinal direction and in one transverse direction from the vertically movable deck into engagement with vertical tracks supported by the ship structural members, resiliently biased rollers extending in the other longitudinal direction and in the other transverse direction from the vertically movable deck into engagement with vertical tracks supported by the ship structural members to urge the fixed rollers against their tracks and inhibit longitudinal and transverse movements of the movable deck, a plurality of latches extending from the deck, a like plurality of groups of latch sockets, ship members depending from the ship and adjacent to the deck, said ship members supporting at vertically spaced positions the sockets of each group for engagement selectively by corresponding latches, a plurality of synchronized drive units to raise and lower the vertically movable deck to selected vertical locations, and means to operate the latches when juxtaposed with their corresponding sockets at the selected vertical locations to secure and support the movable deck in position for cargo stowage.

2. Apparatus as defined in claim 1, wherein at least one vertical stanchion is removably fastened between the fixed decks, further latches extending from the movable deck and further spaced latch sockets along the stanchion cooperating with the further latches to aid in supporting the weight of the cargo loaded movable deck, the stanchion being movable when the movable intermediate deck is secured in its uppermost position to provide a maximum amount of unrestricted storage area on the lower fixed deck.

3. Apparatus as defined in claim 1, wherein the drive units comprise four fixed screw shafts extending between the fixed decks, and driven nut members carried by the screw shafts and secured to the movable deck to raise and lower it to the selected vertical locations.

References Cited in the file of this patent

UNITED STATES PATENTS

| | | |
|---|---|---|
| 143,808 | Cass | Oct. 21, 1873 |
| 283,218 | De Rycke | Aug. 14, 1883 |
| 1,052,221 | Denison | Feb. 4, 1913 |
| 1,247,553 | Linquist et al. | Nov. 20, 1917 |
| 1,611,419 | Copony | Dec. 21, 1926 |
| 1,792,940 | Stein | Feb. 17, 1931 |
| 2,181,279 | McLauthlin | Nov. 28, 1939 |
| 2,247,145 | Baldwin | June 24, 1941 |
| 2,247,146 | Baldwin | June 24, 1941 |